United States Patent [19]
Abruzzese et al.

[11] Patent Number: 5,615,303
[45] Date of Patent: Mar. 25, 1997

[54] CIRCUIT FOR COMPUTING MEMBERSHIP FUNCTION VALUES IN A FUZZY LOGIC CONTROLLER

[75] Inventors: Massimo Abruzzese, Catania; Biagio Giacalone, Trapani, both of Italy

[73] Assignee: Consorzio per la Ricerca sulla Microelettronica nel Mezzogiorno, Catania, Italy

[21] Appl. No.: 408,058

[22] Filed: Mar. 21, 1995

[30] Foreign Application Priority Data

Mar. 31, 1994 [EP] European Pat. Off. ............ 94830157

[51] Int. Cl.$^6$ ..................................................... G06G 7/00
[52] U.S. Cl. ................................ 395/3; 395/61; 395/51; 395/900
[58] Field of Search ............................. 395/3, 51, 900, 395/61

[56] References Cited

U.S. PATENT DOCUMENTS

| | | | |
|---|---|---|---|
| 5,179,629 | 1/1993 | Nakamura | 395/3 |
| 5,343,553 | 8/1994 | Miyazawa et al. | 395/3 |
| 5,410,633 | 4/1995 | Ota et al. | 395/3 |

FOREIGN PATENT DOCUMENTS

| | | | |
|---|---|---|---|
| 0574714 | 12/1993 | European Pat. Off. | G06F 7/48 |
| 3936503 | 5/1990 | Germany | G06F 15/35 |

Primary Examiner—Robert W. Downs
Assistant Examiner—A. Katbab
Attorney, Agent, or Firm—David M. Driscoll; James H. Morris; Brett N. Dorny

[57] ABSTRACT

Circuit for calculation of values of membership functions in a controller operating with fuzzy logic procedures. The membership functions are of triangular or trapezoidal form and are defined in a so-called discourse universe discretized in a finite number of points. The controller includes a central control unit equipped with a memory section for storage of said membership functions, a microprocessor, and an interface. The membership functions are stored by means of a codification of the coordinate of the vertex and the slopes at the sides of the vertex. The circuit includes a calculator connected to the memory section, the microprocessor, and the interface, to determine the value of each membership functions at each point of the discourse universe using the stored vertex and slopes.

34 Claims, 9 Drawing Sheets

CIRCUIT FOR COMPUTING MEMBERSHIP FUNCTION VALUES IN A FUZZY LOGIC CONTROLLER

BACKGROUND OF THE INVENTION

1. Field of Invention

The present invention relates to a circuit for calculation of values for membership functions in an electronic controller operating with fuzzy logic procedures.

Specifically the present invention relates to a circuit for calculation of values of membership functions of triangular or trapezoidal form and defined in a so-called discourse universe discretized in a finite number of points. The controller includes a central control unit equipped with a memory section for storage of said membership functions, and connected to a microprocessor which is connected to an interface.

2. Discussion of the Related Art

Fuzzy logic is now accepted as a technique capable of supplying solutions for a broad range of control problems for which the conventional techniques, e.g. those based on Boolean logic, have proven unsuitable for providing acceptable performance at acceptable cost.

Fuzzy logic provides a method for modelling 'approximate' modes of reasoning typical of the human mind and which play a basic role in the human ability to make decisions under conditions of uncertainty.

Fuzzy logic operates on a linguistic description of reality using a particular class of variables termed linguistic variables. The value of these variables consists e.g. of words or phrases of any natural or artificial language. Basically, to each variable is assigned a corresponding semantic meaning of the words or phrases which are used in modelling of a given problem.

In addition, with each variable can be syntactically combined a group of values dependent on it which can take on different meanings depending on the context in which they are employed. These values are obtained starting from a primary term representing the variable, from its contrary, and from a series of so-called modifiers of the primary term. Such a system is described in European patent application no. 92830095.3.

Each value assigned to a linguistic variable is represented also by a so-called fuzzy set, i.e. a possibilistic distribution function which links each value of the variable in the corresponding definition domain, known also as discourse universe.

The functions which identify a fuzzy set in the discourse universe of a variable are termed membership functions f(m). For example, a value f(m)=0 indicates nonmembership of the point m in the fuzzy set identified by the function f whereas a value f(m)=1 indicates the certainty of the membership of m in the fuzzy set. The entirety of all the fuzzy sets of a linguistic variable is termed 'term set'.

For the membership functions two different types of representation are possible, analytical and vectorial. The former is a function of the definition domain and allows performing a so-called mapping of said domain in a range of values between 0 and 1.

The second type consists of a vectorial sample representation of the membership function obtained by dividing the definition domain in m points and the range [0, 1] in l levels.

Thanks to calculation devices operating in accordance with a reality representation and modelling methodology based on fuzzy logic it has become possible to treat analytically in a manner much closer to human reasoning purely abstract concepts.

To obtain a satisfactory result it is however of basic importance that the membership function of the fuzzy sets be sufficiently and correctly defined in the control device. Indeed, the more said definition reflects the semantics of the fuzzy concept the more the incidence of a term in a rule will be correct and consequently also the value output by the electronic controller operating with fuzzy procedures will reflect reality.

At present, the definition or memorization in an electronic controller based on the fuzzy logic of the membership functions which identify the fuzzy sets represents one of the major constraints on the development of new fuzzy logic applications, thus limiting the theoretical potentials of this methodology.

Indeed, if for the implementation on hardware of the membership functions it is desired that said functions respect the semantics of the fuzzy concept so as to obtain a correct incidence of a term in a rule, one is forced to use a considerable space in the memory. This makes fuzzy logic advantageous only for those applications where the term set of the linguistic variable consists of a small number of membership functions.

The data for a membership function are normally stored in a memory word. In known devices, the memory area occupied is thus negatively influenced by the number of data necessary to define these membership functions. In many cases it has proven sufficient to store triangular or trapezoidal membership functions, so as to reduce the amount of data necessary for their storage.

With these triangular or trapezoid membership functions, it is not necessary to store all values of the function at all the points of the discourse universe since only the points where the curve changes slope and the value of this slope are significant.

In the description below we shall call 'significant value storage' a storage of the membership functions by means of values of its slopes and of the coordinates of the points where said slopes change value.

The saving of memory area by storage of significant values requires a subsequent reconstruction of the individual values of the membership functions necessary for application of the rules of inference which control the fuzzy logic process through computing means dedicated to this purpose.

The technical problem underlying the present invention is to provide a digital circuit which would permit reconstruction of the value of a given membership function stored as significant values at a predetermined input value belonging to the discourse universe. This allows use of storage of significant values of the membership functions and hence a considerable saving of memory exceeding the shortcomings which still limit the known solutions.

SUMMARY OF THE INVENTION

The present invention provides a circuit in a controller operating with fuzzy logic which reconstructs the desired value of a membership function stored as significant values at each point of the discourse universe U. The circuit includes a number of calculation sections for determining a difference between a vertex and an input, a difference between a miximum value and a membership function value, and the desired value. A microprocessor is connected to the memory to select a membership function. The circuit may also include a number of sub-blocks for parallel processing of various desired values.

DETAILED DESCRIPTION

Figure 1:
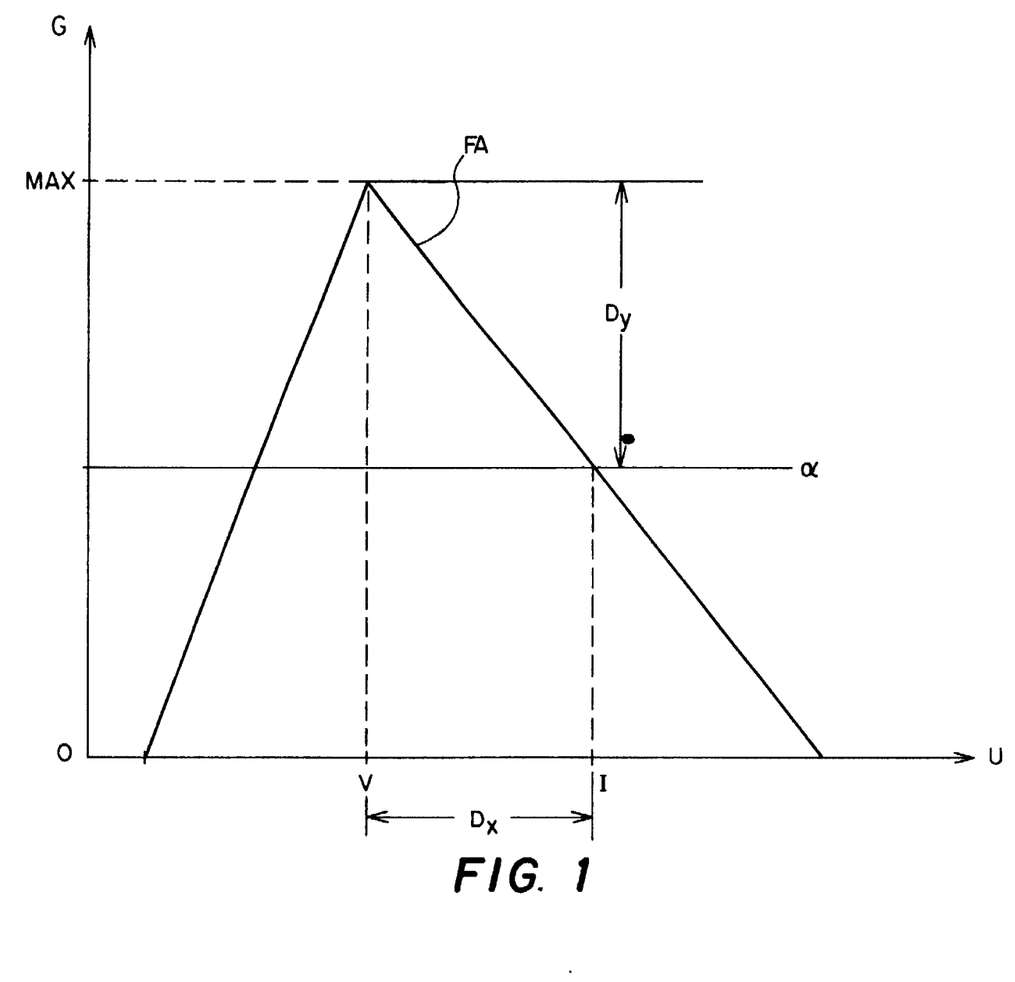
FIG. 1 shows schematically a possible membership function used in a fuzzy architecture.

With reference to the figures, FIG. 1 shows a membership function indicated by FA of a linguistic or logical variable M represented through a vectorial system. Along the axis of the abscissa is the so-called discourse universe U and along the axis of the ordinates is the degree of truth or membership G.

In this particular case, the discourse universe U and the degree of membership G are discretized in one hundred twenty-eight points m and thirty-two levels or values L respectively.

Figure 2:
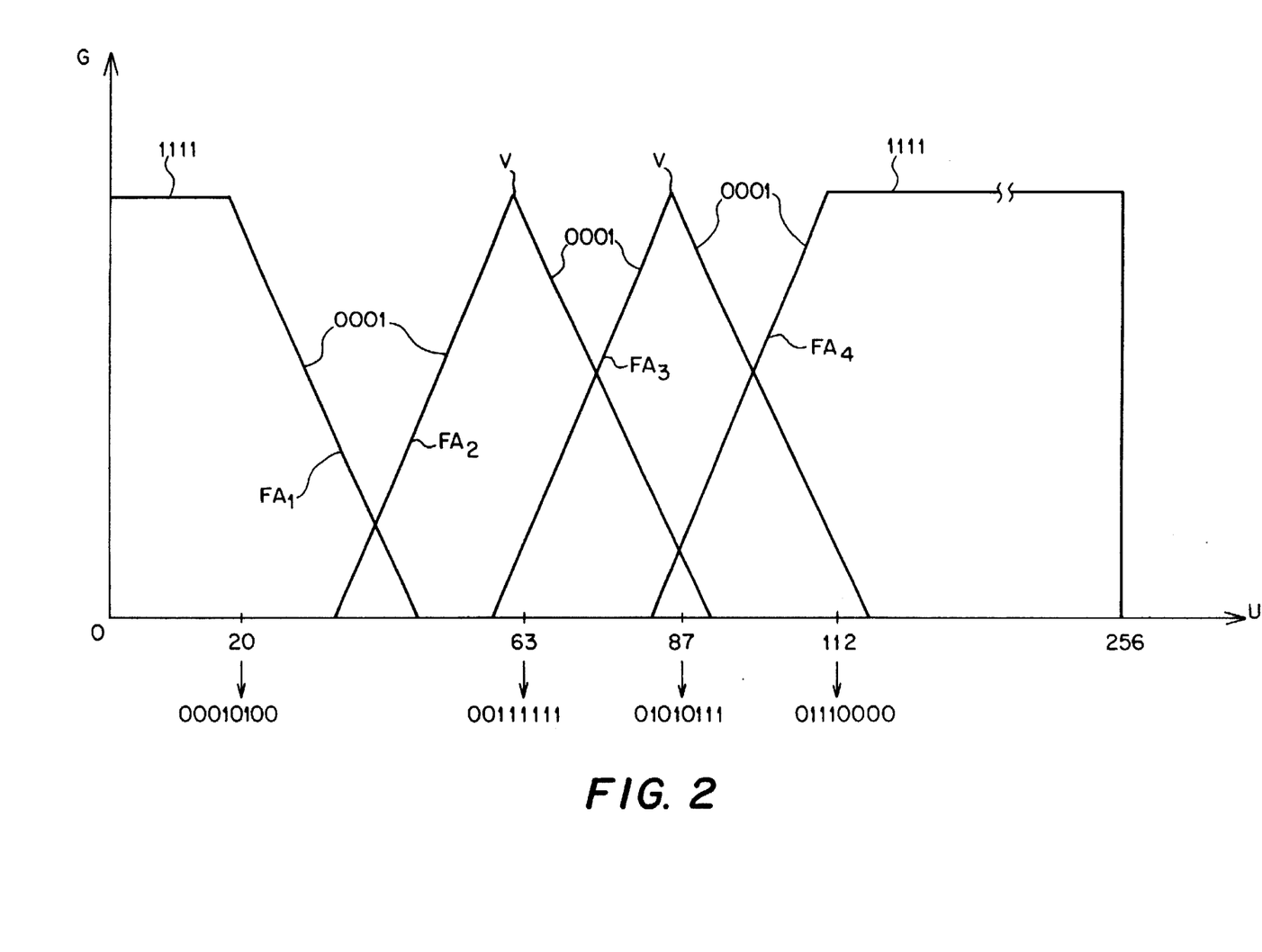
FIG. 2 shows a possible term set of membership functions FA storable as significant values.

The term set of FIG. 2 is made up of four membership functions $FA_i$ which identify in the discourse universe U as many fuzzy sets.

In FIG. 2 the membership functions FA are numbered with the indices i from one to four increasing from left to right.

It is possible to define completely each triangular membership function (or trapezoid at the edges of the discourse universe U) as shown in FIG. 2 by means of the coordinates of their vertex V and the value of the left and right slopes compared with a vertex V of their chart.

This type of digital storage as significant values allows minimization of the amount of memory required for implementation on hardware of the membership functions. A memory word thus has the structure of FIG. 3. A first portion of memory comprises nbp bits which memorize a logic or digital value corresponding to the left side slope, a second and adjacent portion comprises nbv bits which memorize the coordinate of the vertex V (a number of bits equal to that necessary to code the number of levels in which is divided the discourse universe U) and a third and terminal portion comprises nbp bits which memorize the value of the slope of the right side.

Figure 3:
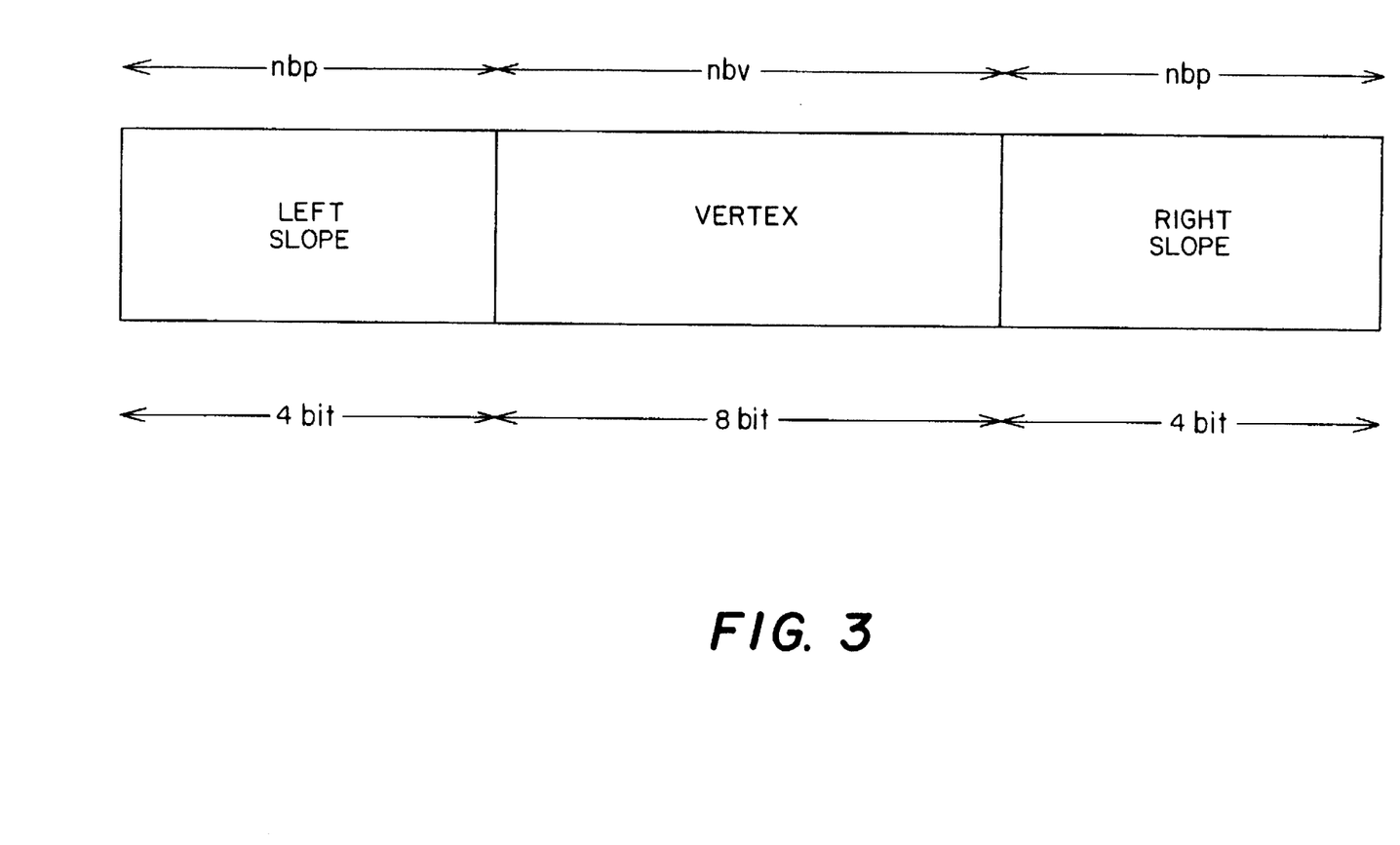
FIG. 3 shows the structure of a memory word containing logical information which codifies one of the membership functions FA of FIG. 2 stored as significant values.

Advantageously in accordance with this storage as significant values, the value of the nbp bits which memorize the right and left slopes of the membership function FA depend on the value of a flag, referred to as 'inclination type'.

If the value of the flag is zero, nbp bits in the memory word indicate the number of vertical levels by which the membership function FA decreases for each unitary horizontal increase starting from the coordinate of the 'vertex'.

For example, a binary value of 3 indicates that the membership function at the point of the discourse universe which follows the vertex coordinate has a height three levels below that of the vertex.

vice versa, if the value of the flag is one, nbp bits of the memory word indicate how many points of the discourse universe correspond to a unit decrease of the membership function in relation to the vertex height. In the term set of FIG. 2 are shown the values of the positions of the vertices and the transformations in binary code of the slopes of the sides. In case of trapezoid membership functions FA the vertex indicates the point of the discourse universe U at which the membership function FA changes slope.

This storage method of significant values of the membership functions FA permits implementation of a fuzzy architecture using extremely small memory devices. On the other hand there are no longer available the levels of truth corresponding to all the points of the discourse universe U.

Figure 4:
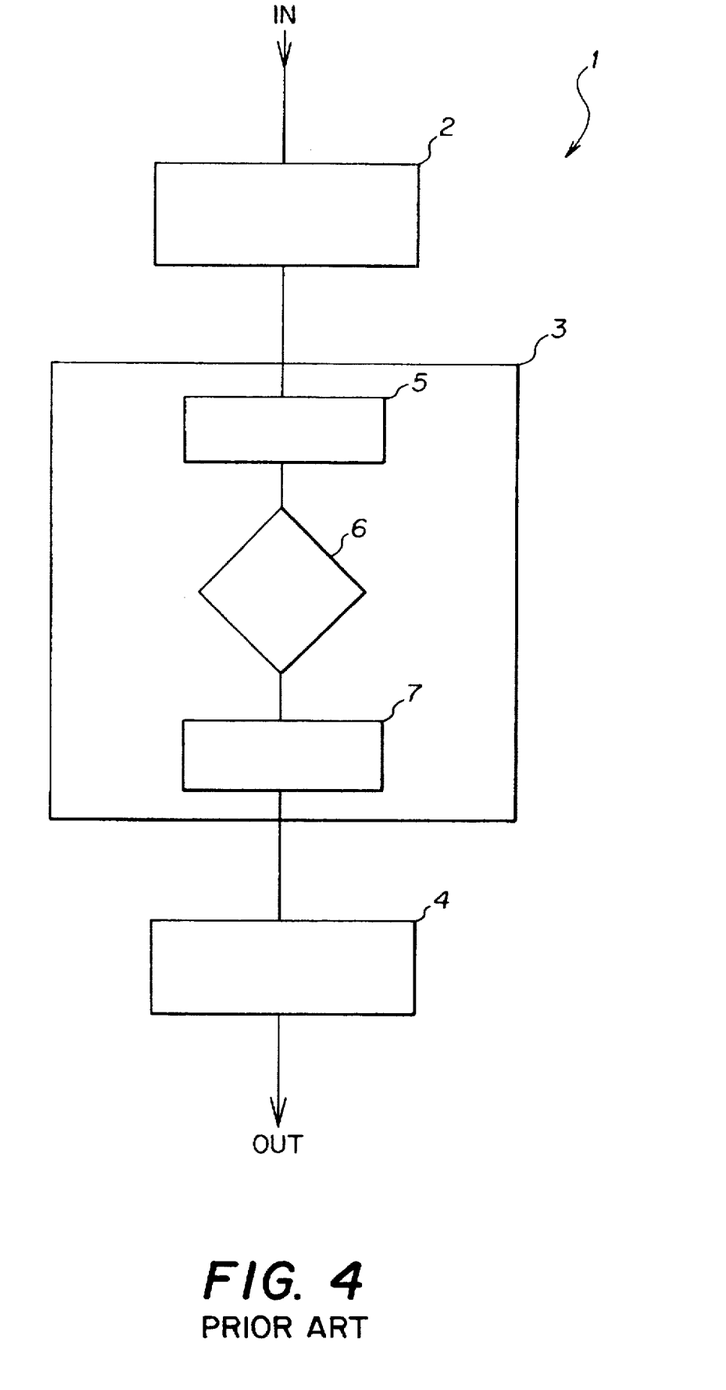
FIG. 4 shows a general schematic view of a fuzzy controller in accordance with the known art.

With reference to FIG. 4, 1 indicates as a whole and schematically an electronic control device operating with fuzzy logic and provided in accordance with the known art. Said controller 1 is basically a machine which receives at input signals for physical control variables, e.g. analog or digital signals coming from sensors, and executes predetermined fuzzy logic inference operations outputting certain control signals.

For this purpose the controller 1 comprises an input or a plurality of inputs IN and an output or a plurality of outputs OUT.

The system it is intended to control, not shown in the figures, sends to the input IN of the electronic controller 1 signals for the physical control variables. Each input IN leads to a corresponding converter device (fuzzyfier) 2 capable of converting an input signal into a fuzzy logic datum, i.e, a so-called membership function FA. The controller 1 also comprises a central control unit 3 in which are stored the membership functions FA of the fuzzy logic and in which is also performed the fuzzy logic computation.

Specifically said central control unit 3 has a section of memory 5 (antecedent memory—ADM) for storing the values for the membership functions FA which appear only in the left, or antecedent, part of the fuzzy inference rules, and a section of memory 7 (consequent memory—CDM) which contains the data for the membership functions FA which appear only in the right, or consequent, part of said fuzzy rules.

Between the two memory sections 5 and 7 is provided a calculation section 6 for performance of the fuzzy logic inference operations.

The architecture of the controller 1 is completed by a conversion device 4 (defuzzyfier) to which is assigned the task of supplying an adequate interface between the controller 1 and the external world.

In case of storage of significant values of the membership functions FA in this control unit 3, there must be inserted also a circuit 8 in accordance with the present invention to which is assigned the task of calculating the degree of truth of a given input value I, i.e. the value of the membership function FA at that certain value.

Figure 5:
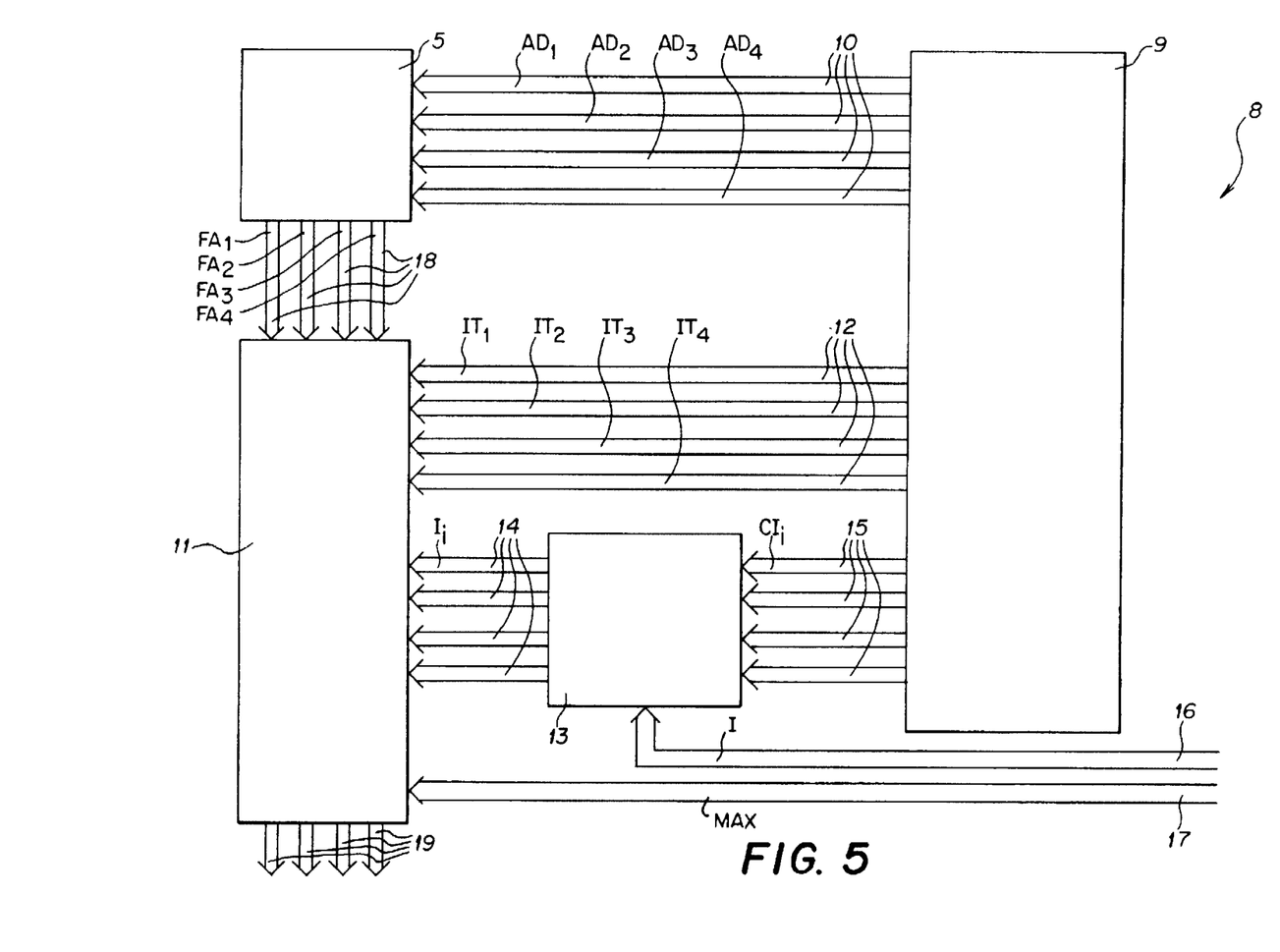
FIG. 5 shows schematically a calculation circuit in accordance with the present invention.

In FIG. 5, 8 indicates as a whole a circuit which performs calculation of these values FA(I).

In the circuit 8 a microprocessor 9 is connected through a bus 10 to the memory 5 to which it supplies information $AD_i$ concerning the membership function FA to be selected.

Advantageously in accordance with the present invention the microprocessor 9 is also connected to a calculator 11 to which it supplies through bus 12 a flag $IT_i$ of the type for codification of the slope of the sides of said function.

Said calculator 11 also receives a signal through bus 14 from an interface 13 which is in turn connected through bus 15 to the microprocessor 9 which supplies to said interface 13 the input codes $CI_i$.

In addition, the memory 5 supplies through bus 18 to the calculator 11 the selected membership function $FA_i$.

A program memory PM outside the circuit 8 and not shown in FIG. 5 supplies to the interface 13 the value I of the input through a bus 16 and to the calculator 11 the maximum number of truth levels MAX through a bus 17.

The program memory PM contains the microprocessor 9 necessary for calculation of the fuzzy controller outputs.

On the basis of the data received the calculator 11 supplies through the bus 19 the value of the selected membership function FA at a predetermined point of the discourse universe U coded as the input value I.

Figure 6:
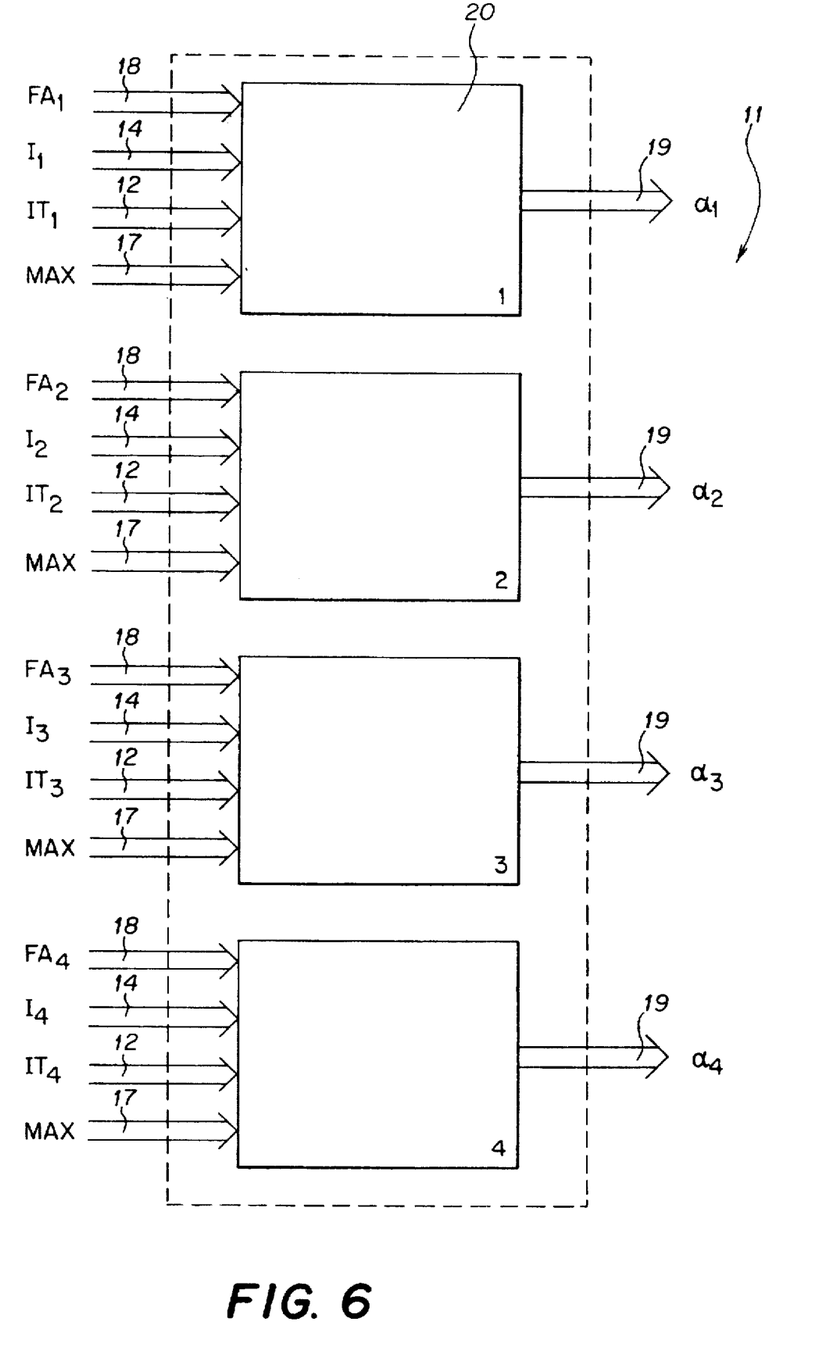
FIG. 6 shows schematically the internal structure of a detail of the circuit of FIG. 5.

FIG. 6 shows in greater detail the structure of the calculator 11 which comprises N equal sub-blocks 20, N being the degree of parallelism used for calculation of the values α. In the example of FIG. 6, N equals four.

Each sub-block 20 receives at its input:

a memory word containing the representation for significant values of the membership function $FA_i$ contained in the memory 5 and corresponding to the code $AD_i$ supplied to the memory 5 by the microprocessor 9, an input value $I_i$ belonging to the discourse universe U at which it is desired to take the value $\alpha_i$ of the selected membership function, a flag $IT_i$ to indicate the type of coding the user wishes to use for the right and left slopes of the membership function, and the maximum number of truth levels.

The output of a sub-block 20 is the sought value α of the selected membership function.

Figure 7:
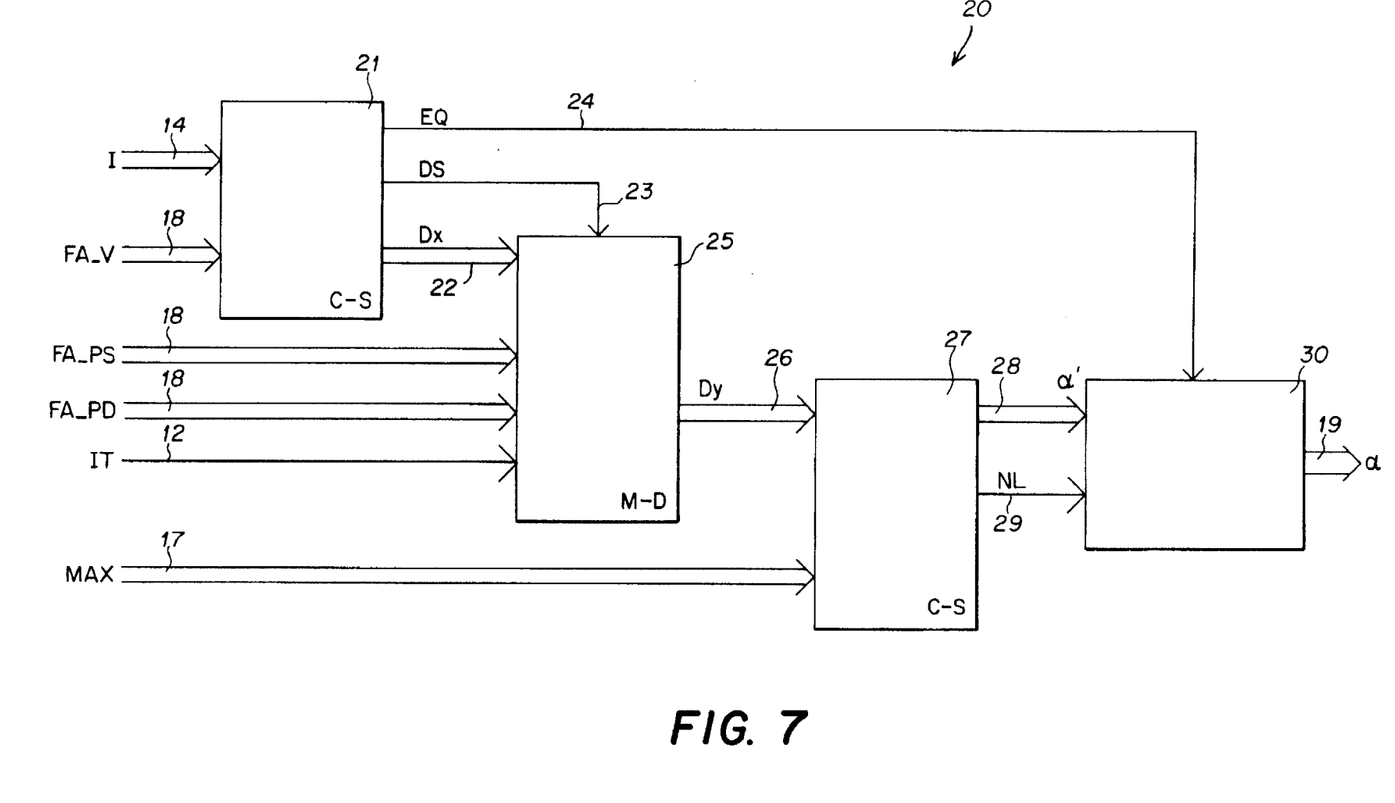
FIG. 7 shows schematically the structure of a detail of the structure of FIG. 6.

The internal structure of a generic sub-block 20 is shown in FIG. 7. It comprises a first comparator-subtractor block 21 in absolute value.

The comparator-subtractor block 21 receives at its input through the bus 14 a value I corresponding to a selected point in the discourse universe U as well as the binary code FA_V of the coordinate of the vertex V of the membership function FA through the bus 18.

This comparator-subtractor block 21 supplies at its output flags EQ and DS and a binary value Dx equal to the difference in absolute value between the coordinate of the vertex V and the point I of the universe.

This value Dx is input through bus 22 to a second multiplier-divider block 25.

This multiplier-divider block 25 also receives:

the flag DS through a bus 23, the coded values FA_PD and FA_PS for the right and left slopes of the membership function FA through the bus 18, and the flag IT through the bus 12.

The multiplier-divider block 25 is connected through a bus 26 to another comparator-subtractor block 27. The bus 26 carries a binary value Dy equal to the difference between the height of the vertex MAX and the value α of the membership function FA at the input value I.

The comparator-subtractor block 27 receives the value MAX through the bus 17 and outputs a value α' through a bus 28 and a flag NL through a bus 29.

The sub-block 20 comprises a last selector block 30 which receives the flags EQ and NL as well as the value α' and, based thereon, supplies the desired value α.

Figure 9:
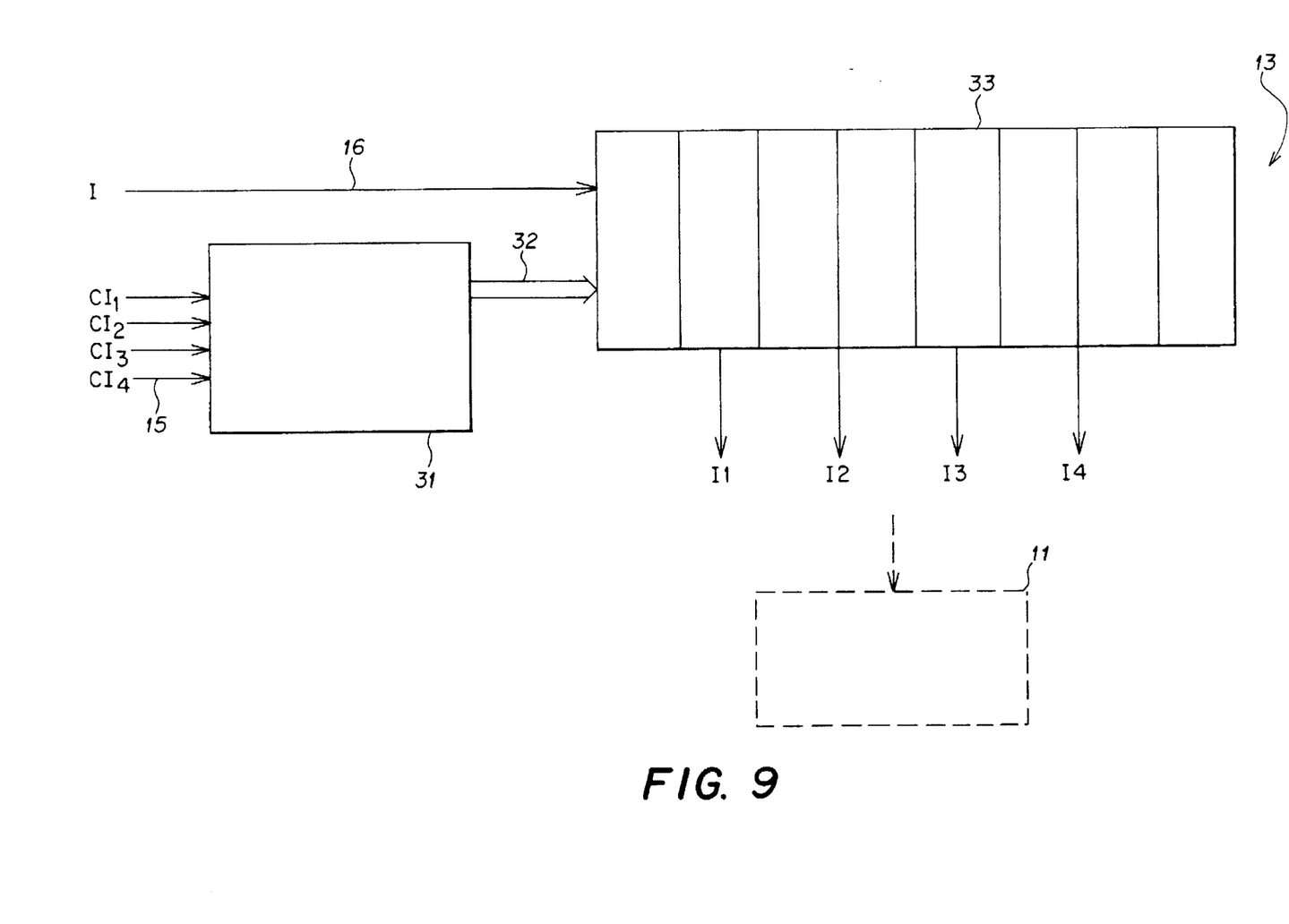
FIG. 9 shows schematically another detail of a circuit in accordance with the present invention.

Advantageously in accordance with the present invention the circuit 1 comprises an interface block 13 with the exterior shown in FIG. 9.

Said interface block 13 comprises a first decoding element 31 which receives at its input the signals $CI_i$ through the busses 15.

The decoding element 31 transforms the signals $CI_i$ into the value $I_i$ of the coordinates of the input points in the discourse universe U and transmits them through another bus 32 to another memory 33.

The memory 33 stores the values I of all the input variables and supplies them to the calculator 11 in an order depending on the fuzzy rules.

We shall now discuss operation of the circuit in accordance with the present invention with particular reference to FIG. 7.

The binary value I of the coordinate of the input point present on the bus 14 is compared in the comparator-subtractor block 21 with the value FA_V of the coordinate of the vertex V in the discourse universe U of the selected membership function FA.

If the position FA_V of the vertex V is greater than the value I the flag DS is set at logic value 0 but otherwise it is set at 1.

This flag DS thus indicates whether it is necessary to consider the data for the right or left part of the membership function FA selecting also the correct flag IT.

If the value I is at said vertex V or in a zone of the membership function FA in which it has a horizontal trend equal to the value MAX of the vertex, e.g. if the membership function FA is trapezoid, the flag EQ is set at logic value 1 but otherwise it is set at 0.

In this comparator-subtractor block 21 is also calculated the module Dx of the difference between the coordinate FA V of the vertex and the value I which is also shown on the graph of FIG. 1.

The multiplier-divider block 25 performs the calculation of the value Dy, i.e. the difference between the height FA_V of the vertex V and the membership function FA at the value I.

On the basis of the value of the flag DS, the multiplier-divider block 25 chooses one of the two values IT present on the bus 12 and read from the microprocessor 9 memory.

On the basis of the value of IT the multiplier-divider block 25 performs and outputs on the bus 26 the value Dy given by the product or division between the value Dx received at input through the bus 22 and the slope P (FA_PD or FA_PS present on the bus 18).

In particular:

if the flag IT is equal to the value 0 the multiplier-divider block 25 calculates:

$$DY = Dx * P$$

if the flag IT is equal to the value 1 the multiplier-divider block 25 calculates:

$$Dy = Dx/P$$

The value Dy thus obtained is sent in input to the comparator-subtractor block 27 through the bus 26; this comparator-subtractor block 27 also receives as an input the value MAX of the height of the vertex V through the bus 17.

If Dy is less than MAX the comparator-subtractor block 27 performs subtraction between the value Dy calculated in the multiplier-divider block 25 and the value MAX and outputs said value α' on the bus 28.

If Dy is greater than MAX the comparator-subtractor block 27 sets the flag NL equal to 0. This flag NL thus indicates whether the value I is in a zone where the membership function FA has value null.

The selector block 30 receives the value α' along the bus 28 as well as the values of the flags NL and EQ through the busses 29 and 24 respectively.

The output α of said selector block 30 is selected on the basis of the following rule:

if EQ is equal to zero and NL is also equal to zero the output α coincides with the value α :

if EQ is equal to one and NL is equal to zero the output α coincides with the value MAX;

if EQ α is equal to zero and NL is equal to one the output α is set at zero.

Figure 8A:
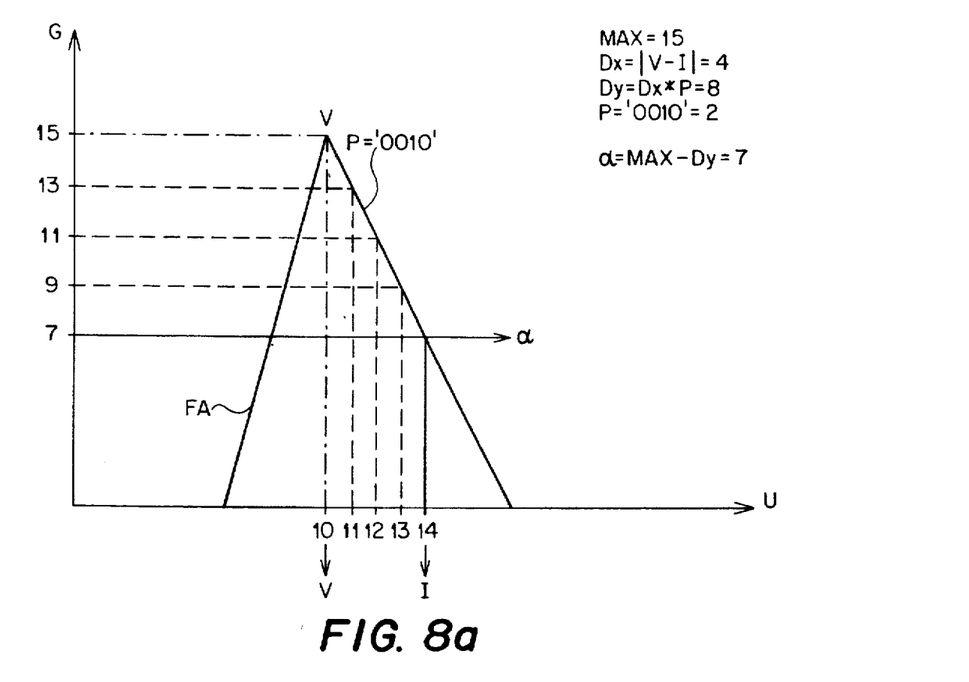
FIGS. 8A and 8B show graphically examples of calculations provided by means of the circuit in accordance with the present invention.
Figure 8B:
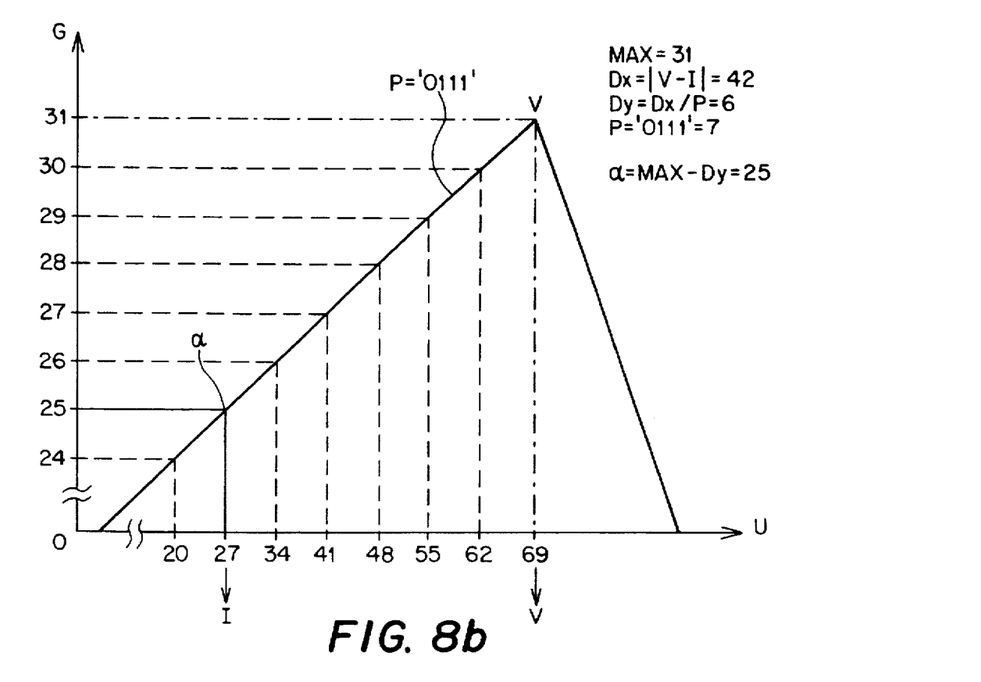

This rule can be summarized in accordance with the following chart:

| EQ | NL | α |
|----|----|----|
| 0 | 0 | α' |
| 1 | 0 | MAX |
| 0 | 1 | 0 | in FIGS. 8A and 8B are illustrated graphically the calculations performed by the circuit in accordance with the present invention in two embodiments.

The embodiments show how the result of said calculations is correct both in the case of input points corresponding to a coordinate to the right of that of the vertex and in the case of input points corresponding to a coordinate to the left of that of the vertex on the axis of the discourse universe U.

Advantageously in accordance with the present invention the interface block 13 receives and stores the values i of the inputs of the controller i and supplies them to the calculator 11 in an order depending on the fuzzy rules.

The input interface block 13 serves to speed up substantially The operation of the antecedent part of the fuzzy controller.

The interface block 13 receives the input values $I_i$ one at a time and stores their value after having decoded it by means of the decoding element 31 for the entire period of time necessary to obtain the outputs of the controller 1.

In the calculation phase, on the basis of the binary code I coming from the program memory PM the interface block 13 supplies to the calculator 11 the input values I1, I2, I3 and I4 which are to be processed.

The same code I is sent to the memory 5 to select the memory words for those inputs.

The degree of parallelism in the calculator block 11 being equal to four, the decoding element 31 must address through the bus 32 the four input variables to be sent to the respective sub-blocks 20. This operation takes place on the basis of the signals $CI_i$ which are associated with the four inputs $I_i$ on the basis of the fuzzy rules.

In the program memory PM a memory word thus comprises:

a first portion of dimensions nbi bits which contains the binary value $CI_i$ of an input variable and is used to select the input variable through the decoding element 31, a second portion of dimensions nbf bits which contains the address $AD_i$ of the memory word in which is stored the membership function FA to be associated with the input identified by the nbi bits and is used together with the binary value $CI_i$ to select the membership function FA to be compared with the input, and a third portion of dimensions nbc bits which contains the value of the selectors IT for the right and left parts of the membership function FA (nbc=2) and is used for control of the calculator block 11. The overall size of the memory word is equal to:

word dimensions=nbi+nbf+nbc

In the example considered there are at most eight input variables (nbi=3) and each of these can have a maximum of eight membership functions FA (nbf=3); for a parallelism (N) equal to four in the computation of the values there are required:

$$N*(nbi+nbf)=32\text{bit}$$

If the specifications for the antecedent memory part changes these magnitudes vary consequently.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. Circuit for calculation of values of membership functions in a controller operating with fuzzy logic procedures, said membership functions being of triangular or trapezoidal form and defined in a so-called discourse universe discretized in a finite number of points and being codified by a coordinate of the vertex and slopes at the sides of the vertex, said circuit comprising:

a central control unit including:

a memory section for storing of a vertex and at least one slope of each of said membership functions, a microprocessor for selecting one of said membership functions; and an interface for selecting a point of the discourse universe corresponding to the selected membership function; and a calculator for determining the value of the selected membership function at the selected point of the discourse universe based upon a vertex and at least one slope for the selected membership function stored in said memory section.

2. A circuit in accordance with claim 1, further comprising a program memory connected to said calculator to provide a maximum value for the selected membership function.

3. A circuit in accordance with claim 2, further comprising at least one bus between said microprocessor and said interface for transferring a plurality of binary codes which represent points in the discourse universe corresponding to values of inputs.

4. A circuit in accordance with claim 2, further comprising at least one bus between said interface and said calculator for transferring an input value belonging to the discourse universe for determining the membership function value.

5. A circuit in accordance with claim 2, further comprising at least one bus between said microprocessor and said calculator for transferring a value of a slope type selector, wherein said calculator determines the value of the selected membership function based upon the slope type selector.

6. A circuit in accordance with 2, wherein said calculator provides an output of a binary value of the membership function at the input value.

7. A circuit in accordance with claim 2, wherein said calculator includes a plurality of parallel sub-blocks each determining a value of a different membership function.

8. A circuit in accordance with claim 7, wherein each sub-block includes:
   a first comparator-subtractor block;
   a second comparator-subtractor block connected to the first comparator-subtractor block;
   a third comparator-subtractor block connected to said second comparator-subtractor block; and
   a selector block connected to said third comparator-subtractor block.

9. A circuit in accordance with claim 8, wherein said first comparator-subtractor block determines a value of a difference (Dx) between a value of a vertex coordinate received from said memory section and the input value received from said interface.

10. A circuit in accordance with claim 8, wherein said second comparator-subtractor block determines a value of the difference (Dy) between the height of a vertex and an ordinate of a membership function based upon a value difference received from said first comparator-subtractor block, a slope received from said memory section, and a slope type received from said microprocessor.

11. A circuit in accordance with claim 8, wherein said third comparator-subtractor block determines a difference between a value difference received from said second comparator-subtractor and a maximum value received from said program memory.

12. A circuit in accordance with claim 8, wherein said selector block determines a height of the membership function at the input value based upon a difference received from said third comparator-subtractor block.

13. A circuit in accordance with claim 1, wherein said interface includes:
   means for receiving and converting codes corresponding to input data,
   a memory storing binary values of the input data, and
   means for supplying said binary values corresponding to selected membership functions to said calculator in an order which depends on fuzzy logic rules.

14. A circuit for determining a value of a membership function based upon a vertex, a slope value, a slope type, an input, and a maximum value, said circuit comprising:
   a first calculator for determining a first difference between said vertex and said input;
   a second calculator for determining a second difference based upon said slope value, said slope type, and said first difference;
   a third calculator for determining said value based upon said second difference and said maximum value.

15. A circuit according to claim 14, wherein said first calculator includes a comparator-subtractor.

16. A circuit according to claim 14, wherein said second calculator includes means for receiving a first and second slope, said second slope having a different magnitude than said first slope, and means for selecting one of said first and second slope as said slope.

17. A circuit according to claim 16, wherein said first calculator outputs a signal indicative of whether said input is greater or less than said vertex, and wherein said selecting means selects said first and second slope based upon said signal.

18. A circuit according to claim 14, wherein said second calculator includes a multiplier-divider.

19. A circuit according to claim 14, wherein said second calculator includes means for receiving a slope type signal, and wherein said second calculator determines said second difference in a first manner or a second manner based upon said slope type signal.

20. A circuit according to claim 14, wherein said third calculator includes a calculation portion and a selection portion.

21. A circuit according to claim 20, wherein calculation portion determines a third difference between said maximum value and said second difference.

22. A circuit according to claim 21, wherein said selection portion selects one of said third difference, zero or said maximum value as said value of said membership function.

23. A circuit according to claim 22, wherein said calculation portion outputs a null signal if said third difference is less than zero, and wherein said selection portion selects zero if said null signal is outputted.

24. A circuit according to claim 22, wherein said first calculator outputs an equal signal if said vertex is equal to said input, and wherein said selection portion selects said maximum value if said equal signal is output.

25. A circuit according to claim 14, further comprising:
   a memory for storing a plurality of vertices and slopes, each vertex and at least one slope corresponding to one of a plurality of membership functions; and
   means for outputting a selected vertex to said first calculator and a selected slope to said second calculator.

26. A circuit according to claim 14, further comprising:
   an interface for converting and storing each of a plurality of input data to a binary value in said discourse universe and for outputting a selected binary value to said calculator as said input.

27. A fuzzy logic processor comprising:
   a memory for storing a vertex and at least one slope for each of a plurality of membership functions;
   a calculation circuit, receiving inputs, for determining values of selected membership functions for said inputs based upon a vertex and at least one slope stored in said memory for each of said selected membership functions and a corresponding slope type; and
   a processing section for performing fuzzy reasoning based upon said values.

28. A fuzzy logic processor according to claim 27, wherein said calculation circuit includes:
   means for receiving a vertex and at least one slope corresponding to a selected membership function and an input;
   a first calculator for determining a first difference between said received vertex and said received input;
   a second calculator for determining a second difference based upon said received slope, a slope type, and said first difference;
   a third calculator for determining a value of said selected membership function based upon said second difference and a maximum value.

29. A fuzzy logic processor according to claim 27, wherein said calculation circuit includes a plurality of parallel sub-blocks, each sub-block determining the value of a selected membership function for an input.

30. A method for determining the value of a membership function for an input comprising the steps of:

storing a vertex and at least one slope of said membership function;

determining a first difference between said vertex and said input;

determining a second difference based upon said at least one slope, a slope type, and said first difference;

determining a value of said selected membership function based upon said second difference and a maximum value.

31. A method according to claim 30, wherein two slopes having different magnitudes are stored for said membership function, and wherein said second determining step includes the step of selecting one of said two slopes upon which to base said second difference.

32. A method according to claim 31, wherein said second selecting step is based upon said first difference.

33. A method according to claim 30, wherein said second determining step includes:

receiving a signal indicative of the slope type;

determining said second difference in a first manner or a second manner based upon said slope type.

34. A method for fuzzy logic reasoning comprising the steps of:

storing a vertex and at least one slope for each of a plurality of membership functions in a memory;

determining values of selected membership functions for inputs based upon said inputs, a vertex and at least one slope stored in said memory for each of said selected membership functions and a slope type; and performing fuzzy reasoning based upon said values.

\* \* \* \* \*

UNITED STATES PATENT AND TRADEMARK OFFICE
CERTIFICATE OF CORRECTION

PATENT NO. : 5,615,303

DATED : March 25, 1997

INVENTOR(S) : Massimo ABRUZZESE and Biagio GIACALONE

It is certified that error appears in the above-indentified patent and that said Letters Patent is hereby corrected as shown below:

Please amend claim 1 as shown below:

1. Circuit for calculation of values of membership functions in a controller operating with fuzzy logic procedures, said membership functions being of triangular or trapezoidal form and defined in a so-called discourse universe discretized in a finite number of points and being codified by a coordinate of the vertex and slopes at the sides of the vertex, each membership function corresponding to one of a plurality of input variables, said circuit comprising:

a central control unit including:

a memory section for storing of a vertex and at least one slope of each of said membership functions, a microprocessor for selecting one of said membership functions based upon one of the input variables; and an interface for selecting a point of the discourse universe corresponding to the selected membership function and a value of the one of the input variables; and a calculator for determining the value of the selected membership function at the selected point of the discourse universe based upon a vertex and at least one slope for the selected membership function stored in said memory section.

Signed and Sealed this

Fifth Day of August, 1997

*Attest:*

*Attesting Officer*

BRUCE LEHMAN

*Commissioner of Patents and Trademarks*